INVENTOR.
JACKSON M. LUKER

Patented Feb. 1, 1949

2,460,644

UNITED STATES PATENT OFFICE 2,460,644

MEANS FOR WRAPPING TUBULAR CAKE PANS

Jackson M. Luker, Urbana, Ill.

Application September 8, 1945, Serial No. 615,179

7 Claims. (Cl. 93—2)

This invention relates to a method and means for providing a flexible sheet of wrapping material over the open top of a tubular cake pan and of securing the sheet of wrapping material in place against accidental and/or unintentional removal from the pan.

An object of the invention is to teach a method of providing a sheet of flexible wrapping material over the open exposed top portion of a tubular cake pan containing a cake having been baked therein, whereby the contents of the pan are not jolted or otherwise subjected to undesirable rough handling incident to the application and securing of the wrapping material to the cake pan.

Another object of the invention is to provide a device for receiving a tubular cake pan containing an angel food cake baked therein and for then moving said pan whereby it will be successively presented to mechanisms for placing a sheet of flexible wrapping material over the open top of the pan, of then draping the wrapping material downwardly over the upper outer side walls of the pan, and of then to means for securing the wrapping material against accidental and/or unintentional removal from the pan.

A further object of the invention is to provide a device having the hereinabove-described characteristics and wherein the pan to be wrapped is manually fed to the sheeting means, the draping means, and the wrapping and tying means, and wherein each of said means is automatically operated when the pan to be wrapped is in a certain predetermined position, by means of control mechanisms operated by the manual pan feeding means.

Another object of the invention is to provide a device having the hereinabove-described characteristics and which is further characterized by its rigidity and simplicity and ease of maintenance.

These and other objects are attained by the means described herein and disclosed in the accompanying drawings in which.

Figure 1:
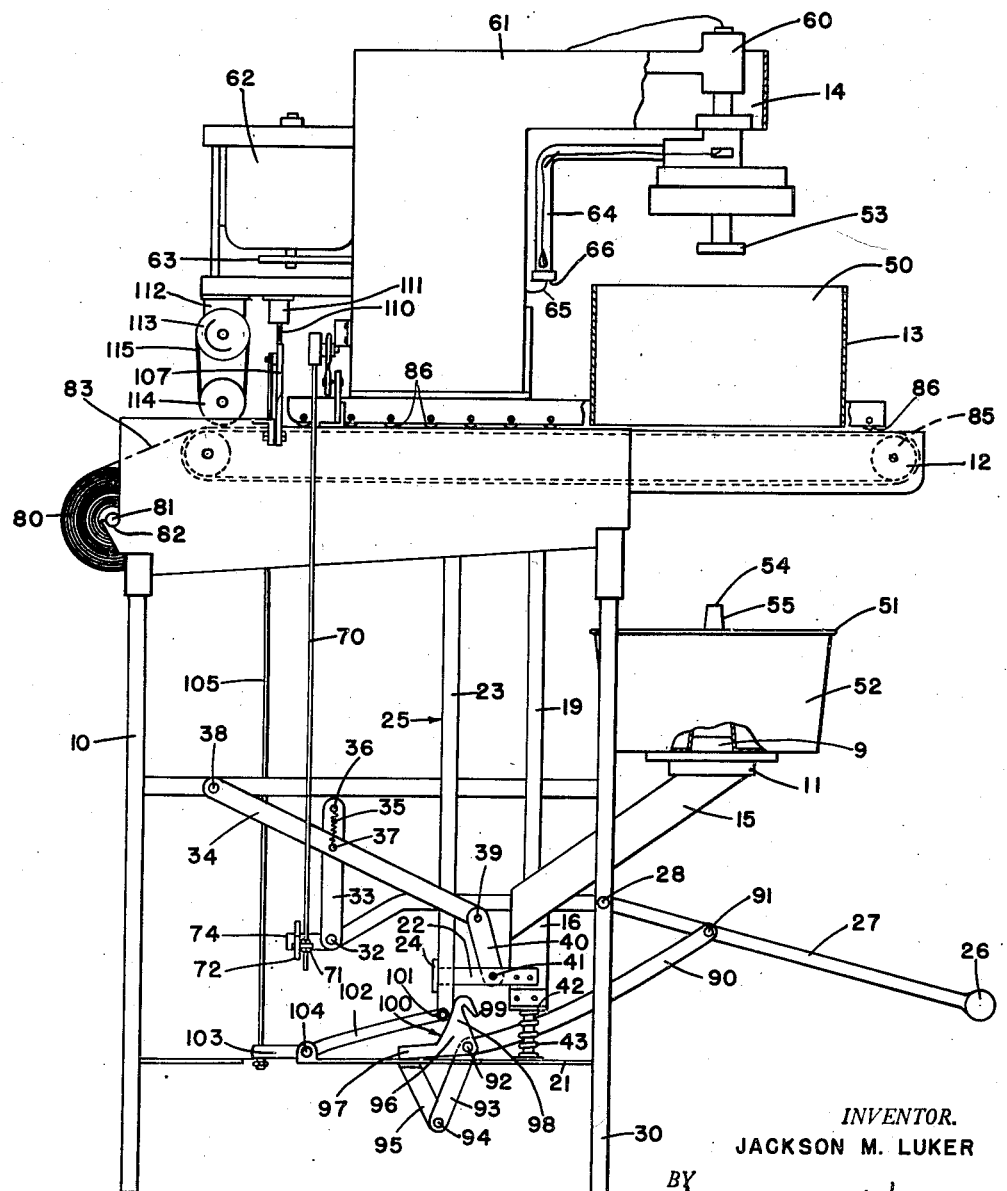
Fig. 1 is a side view of the present device, certain parts having been cut away for clarity of detail and understanding, showing the device in its charge and discharge position.

With reference to the drawings, it will be observed that the present device comprises, broadly speaking, a supporting framework 10, a package or pan supporting platform 11, a sheeting mechanism 12, a draping means 13, and a wrapping and tying mechanism 14.

Figure 2:
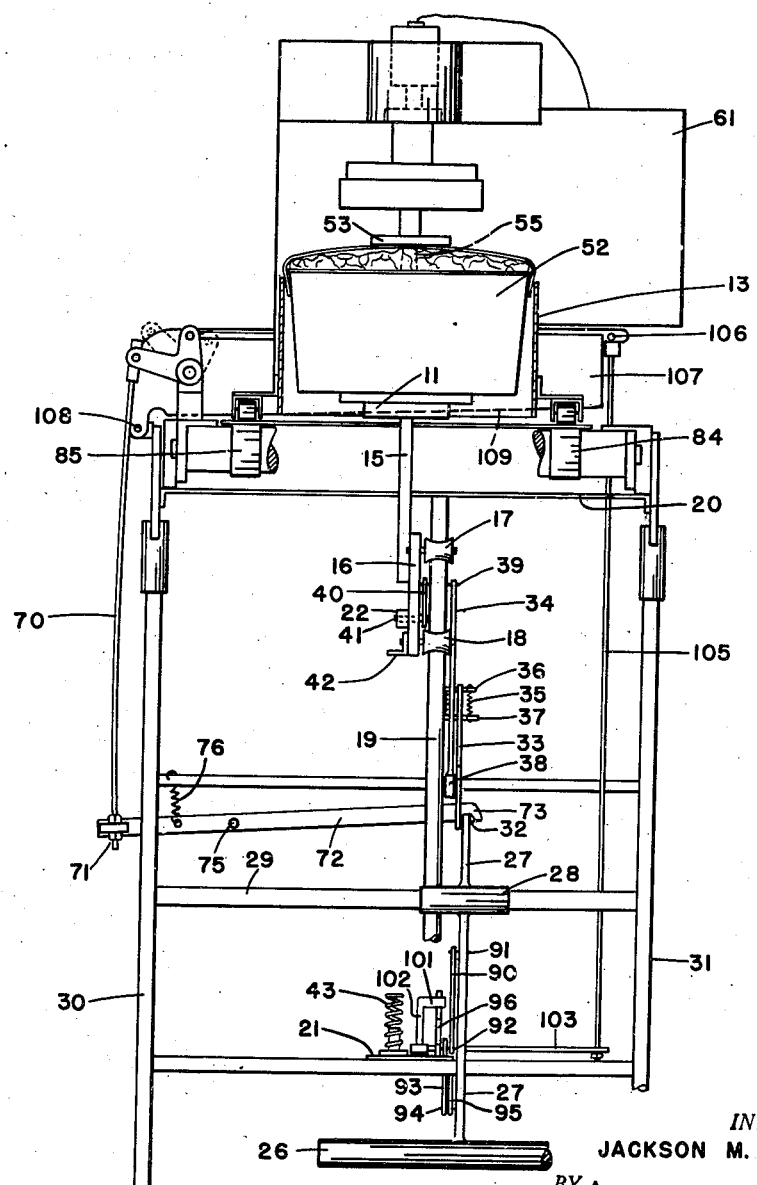
Fig. 2 is a front view of the device of Fig. 1, with certain parts cut away for clarity of detail and understanding, and with the pan feeding means in a fully elevated position, showing the relationship of the various parts of the device just prior to application of the sheet material securing means.

The package or pan supporting platform 11 is mounted for movement between the lowered position disclosed in Fig. 1 and the raised or elevated position disclosed in Fig. 2. Preferably, though not necessarily, the platform may be secured to and carried by an arm 15, the lower end of which may be secured to a guide plate 16 which, as disclosed in Fig. 2, carries a pair of vertically spaced concave rollers 17 and 18 which engage and roll along a vertically disposed track 19, the upper and lower ends of which are fastened to structural members 20 and 21 respectively.

Guide plate 16 is likewise provided with a stabilizing member 22 which is adapted to slide between a pair of laterally spaced track members 23. Stabilizing member 22 preferably terminates in a bearing member 24 which is adapted to engage faces 25 of the track members 23.

Vertical movement is imparted to platform 11 by means of foot treadle 26 which is secured to and carried by a linkage member 27, pivotally secured as at 28 to a bearing support member 29 which extends between legs 30 and 31 of the support frame. That end of linkage member 27 remote from treadle 26 is pivotally secured at 32 to a linkage member 33 which is resiliently connected to arm 34 by means of springs 35, the upper ends of which springs are secured to linkage 33 by means of a pin 36, and the lower ends of which springs are secured to arm 34 by means of a pin 37. One end of arm 34 is pivotally mounted relative to the framework at 38, the other end of said arm being pivotally secured at 39 to a short link 40, the lower end of which link is pivotally connected as at 41 to stabilizing member 22.

It will be observed that as foot treadle 26 is forced downwardly linkage member 33 will be forced upwardly thereby elevating the free end of arm 34, which in turn will lift guide plate 16 and platform 11 which is secured thereto by arm 15. At this point it should be noted that springs 35 will damp out or absorb any sudden or violent motion or vibration which would otherwise be imparted to the platform through the linkage mechanism incident to actuation of the foot treadle.

In the preferred embodiment of the invention the lower portion of guide plate 16 is provided with an out-turned lip 42 which is adapted to engage, when the platform is in a fully lowered position, a bumper spring, or other resilient member, 43. In this manner platform 11 will be resiliently braked in its downward travel from the raised position of Fig. 2.

Platform 11 will be moved from its lowered to a raised and back to its lowered position along a fixed vertical path.

The draping means 13 may comprise a housing having an aperture 50 shaped or having a contour similar to the contour of the upper portion of the package or pan to be wrapped. The sides of aperture 50 should be so proportioned relative to the area of the package or pan to be wrapped so as to loosely engage the upper perimeter 51 of pan 52 located on platform 11.

A stop member 53 is positioned above housing 13 and in substantial vertical alignment with the path traveled by platform 11. Stop member 53 is adapted to be engaged by the upper surface 54 of central tube 55 of the cake pan for limiting the upward travel of said pan relative to housing 13, see Fig. 2. If desired, stop member 53 may be secured to and carried by the spindle head 60 of the tying and knotting mechanism 14.

Before discussing the tying and knotting mechanism, it should be clearly understood that the present invention is not directed to any particular type of wrapping and knotting device, wherefore the reader is referred to the B. H. Bunn Patents #1,606,290, dated November 9, 1926, and #1,994,453, dated March 19, 1935, for a detailed description of the tying and knotting mechanism. It will be assumed, for the purpose of the present patent, that the numeral 61 denotes a Bunn tying and knotting machine, such as described in the two above-mentioned patents. For the purpose of the present invention it will be observed that such a machine includes an operating motor 62 which is connected by means of a belt 63 to a clutch device, not illustrated, which controls the operating characteristics of said tying and knotting machine. The machine includes a wrapping or needle arm 64 through which a tying cord 65 is suitably threaded. Arm 64 is adapted to be moved in a circular path about the vertical axis of spindle head 60 incident to operation thereof.

In those instances when tubular cake pans are being wrapped the relationship between stop member 53, bottom face 66 of the needle arm, and bead 51 of pan 52 is such that several loops of cord or twine 65 will be disposed just under bead 51 of the cake pan.

The operating characteristics of the tying and knotting mechanism may be controlled by means of an actuator rod 70, the lower end of which is pivotally secured as at 71 to one end of trip arm 72, the other end of which terminates in a hook-like member 73 which is adapted to engage end 74 of linkage member 27, see Fig. 2. This trip arm may be pivotally mounted intermediate its ends as at 75. A spring 76 may be provided for normally maintaining hook-like member 73 in contact with end 74 of linkage 27. When foot treadle 26 has been fully depressed for disposing tube 55 of pan 52 in contact with stop member 53, the trip arm 72 will have been moved about its pivot 75 by an amount sufficient to cause actuator rod 70 to effect an engagement of the clutch (not illustrated) of the tying and knotting mechanism for causing the wrapping or needle arm 64 to circle about the pan incident to applying several wrappings of cord or twine under bead 51. After the cord or twine has thus been wrapped around and knotted to the pan, arm 64 will stop or come to rest in the position indicated in Fig. 1.

Means are provided for releasably locating a sheet of wrapping material immediately beneath draping means 13, whereby to position the wrapping material in the path of pan 52 incident to movement from the lowered position of Fig. 1 to the raised position of Fig. 2. The size of the sheet of wrapping material is sufficiently large to cover the upper open end of the cake pan and to also extend downwardly over the upper portion of the outer side walls of the pan, as disclosed in Fig. 2. The relationship between aperture 50 of housing 13 and the outer perimeter of bead 51 of pan 52 will result in the draping of the sheet of wrapping material over the pan.

In the preferred embodiment of the invention means are provided for automatically positioning a new sheet of wrapping material beneath housing 13 each time platform 11 is lowered from the raised position of Fig. 2 to the lowered position of Fig. 1.

Such means may comprise a roll of wrapping material 80 rotatably mounted on shaft 81 in a suitable journal 82. A web 83 from roll 80 is adapted to be fed over a pair of laterally spaced endless belts 84 and 85 (see Fig. 2) and under a series of rollers 86 which positively position web 83 on said endless belts for causing said web of wrapping material to move with said belts incident to their forward travel. As disclosed in Fig. 2, belts 84 and 85 are laterally spaced apart by a dimension greater than the maximum diameter of the upper bead 51 of pan 52, whereby not to interfere with the upward travel of the pan into housing 13.

The operating characteristics of the sheeting mechanism are as follows, reference being had, in particular, to Fig. 1, a link 90 is pivotally secured at 91 to linkage member 27 and at 92 to a rocker arm 93 pivoted at 94 to a support bracket 95. A trip member 96, including a rearwardly extending portion 97 and an upwardly extending portion 98 which terminates in a downwardly inclined portion 99, is pivoted at 92 to links 90 and rocker arm 93. The rearwardly extending portion 97 is connected to upwardly extending portion 98 by means of an inclined edge 100 which is adapted to be engaged by a roller follower 101 secured to and carried by one end of a linkage arm comprising members 102 and 103, and which linkage members are pivoted as at 104 to structural member 21.

When treadle 26 is depressed, trip member 96 will be moved to the left whereby the upwardly extending portion 98 will be tipped downwardly about pivot 92 whereby to pass under follower roller 101, and whereby said roller will be disposed to the right of the downwardly inclined portion 99 of said trip member. It will be observed that arms 102 and 103 will not be actuated about their pivot connection 104 incident to movement of the trip member beneath the follower roller 101. However, when treadle member 26 is moved upwardly, the trip member will be pulled forwardly, that is, to the right with rearwardly extending portion 97 engaging structural member 21 whereby follower roller 101 and its support arm 102 will be lifted upwardly as said roller climbs the inclined portion 99 of the trip member. Upward motion of arm 102 causes a downward motion of arm 103 which is imparted to a connector member 105, the upper end of which is pivotally connected as at 106 to a knife blade 107. Knife 107 is hingedly mounted as at 108 to the frame, said knife including an inclined cutting edge 109 which is adapted to be lowered by connector member 105 for severing web 83 of the wrapping material. As the knife is raised after completion of a downward cutting stroke, it is adapted to engage actuator pin 110 of a suitable switch mechanism denoted generally by the numeral 111 which controls the operating characteristics of electric motor 112. Motor 112 is provided with a pulley 113 which may be connected to pulley 114 of a friction drive wheel by means of a belt, or the like, 115. The operating characteristics of the sheeting device are such that knife 107 will be lowered for cutting the wrapping material as platform 11 approaches the lowered position disclosed in Fig. 1. As the cut is completed, knife 107 will be raised upwardly, by suitable spring means, not illustrated, whereby to engage pin 110 of switch 111 which will energize motor 112. This motor may be of the type which makes but one revolution, after which it stops until again energized by another impulse from switch 111. If it be assumed that one revolution of pulley 113 will impart a linear motion to belts 84 and 85 equal to the length of the individual sheet releasably disposed beneath housing 13, a new sheet of wrapping material will be automatically disposed in place relative to housing 13 preparatory to the next pan wrapping cycle of the machine.

With reference now to Fig. 1, it will be observed that platform 11 is provided with a centrally located, upwardly projecting member 9 which is adapted to project or extend upwardly into the lower or bottom portion of the center tube of pan 52. In this manner the cake pans will be quickly and positively centered relative to the platform preparatory to being introduced upwardly into and through guiding member 13.

It should be understood that various changes in the structural details of the device may be made, such as, by way of example, substituting a suitable clutch mechanism for the one-revolution electric motor 113, within the scope of the appended claims, without departing from the spirit of the invention.

What is claimed is:

1. A package wrapping and tying machine comprising, in combination, a package support platform, means operable for moving said platform from a lowered to a raised position along a fixed vertical path, an open bottomed and open topped housing disposed above and in axial alignment with said platform, said housing having vertical side walls of a contour similar to the contour of the package to be wrapped, means for releasably positioning a sheet of wrapping material across the open bottom of said housing, a tying and knotting mechanism including a wrapping arm mounted for rotation about the upper portion of said housing, a stop member disposed in vertical alignment with said platform and positioned above said housing, said first mentioned means including a foot treadle movable from raised to lowered positions for moving said platform from lowered to raised positions, said platform, when moved upwardly, forcing a package to be wrapped upwardly against the sheet of wrapping material and through said housing for disposing said sheet of wrapping material across the top or upper portion and downwardly over the side walls of said package, said package being limited in its upward movement by said stop member, means operable upon movement of said platform to a fully raised position for actuating said tying and knotting mechanism, and means operable upon lowering of said platform from a raised to a lowered position for actuating the sheet positioning means to position a sheet of wrapping material across the open bottom of said housing.

2. A package wrapping and tying machine comprising, in combination, a package support platform, means for moving said platform from a lowered position to an elevated position along a fixed vertical path, a stop member mounted above the elevated position of said platform and in vertical alignment therewith, means for releasably securing a sheet of wrapping material in a plane substantially at right angles to the vertical path of said platform and between said platform and said stop member, and an open ended cylindrical guide member located between said last mentioned means and said stop member dimensioned to loosely receive a package disposed on said platform incident to movement of said platform to a raised position for draping a sheet of wrapping material over said package, incident to its introduction upwardly into said aperture, said stop member being engaged by said package for limiting its upward travel and clamping said package against further movement relative to said guide member.

3. A device for closing the open top of tubular cake pans with a sheet of wrapping material, comprising in combination a platform, means operable for moving said platform between raised and lowered positions along a fixed path, means on said platform projecting upwardly into the bottom of the tubular portion of a tubular cake pan for locating said pan on and relative to said platform, a stop member disposed above the raised position of said platform, a guiding member disposed below said stop member, said member having an aperture for loosely engaging the upper perimeter of the outer wall of a tubular cake pan, means for releasably disposing a sheet of wrapping material immediately below said guiding member and across said aperture, said platform in its upward travel to a raised position adapted to force a tubular cake pan mounted thereon upwardly against a sheet of wrapping material disposed below said guiding member and thence through the aperture of said guiding member for draping said sheet over the top and sides of said pan, said stop member adapted to be engaged by the upper end of the tubular portion of the pan to limit the upward travel of a pan relative to said guiding member for maintaining the sheet material in contact with the outer wall of the pan and means operable by said first mentioned means as said platform is moved from a raised to a lowered position for actuating the sheet disposing means for disposing another sheet of wrapping material immediately below said guide member and across said aperture.

4. A machine for closing the open top of tubular cake pans with a sheet of wrapping material, comprising in combination a platform, means operable for moving said platform between raised and lowered positions along a fixed path, means on said platform for engaging the bottom wall of a tubular cake pan for locating said pan on and relative to said platform, a stop member disposed above the raised position of said platform, a guiding member disposed below said stop member, said member having an aperture for loosely engaging the upper perimeter of the outer wall of a tubular cake pan, means for releasably disposing a sheet of wrapping material immediately below said guiding member and across said aperture, said platform in its upward travel to a raised position adapted to force a tubular cake pan mounted thereon upwardly against a sheet of wrapping material disposed below said guiding member and thence through the aperture of said guiding member for draping said sheet over the top and sides of said pan, said stop member adapted to limit the upward travel of a pan relative to said guiding member for maintaining the sheet material in contact with the outer wall of a pan mounted on said platform, and for clamping said pan against further relative movement and means operable when said platform is in a fully raised clamped position for tying a length of cord or the like about the upper outer perimeter of a cake pan.

5. A machine for closing the open top of tubular cake pans with a sheet of wrapping material, comprising in combination a platform, means operable for moving said platform between raised and lowered positions along a fixed path, means on said platform comprising an upwardly extending member dimensioned for insertion into the bottom of the center tube of a tubular cake pan and for engaging the bottom wall thereof for locating said pan on and relative to said platform, a stop member disposed above the raised position of said platform, a guiding member disposed below said stop member, said member having an aperture for loosely engaging the upper perimeter of the outer wall of a tubular cake pan, means for releasably disposing a sheet of wrapping material immediately below said guiding member and across said aperture, said platform in its upward travel to a raised position adapted to force a tubular cake pan mounted thereon upwardly against a sheet of wrapping material disposed below said guiding member and thence through the aperture of said guiding member for draping said sheet over the top and sides of said pan, said stop member adapted to limit the upward travel of a pan relative to said guiding member and for maintaining the sheet material in contact with the outer wall of a pan mounted on said platform, means operable when said platform is in a fully raised position for applying a length of cord or the like over the outer surface of the sheet of wrapping material at the upper outer perimeter of a cake pan mounted on said platform for securing said sheet of wrapping material to said pan against accidental or unintentional displacement therefrom, and means operable incident to lowering of said platform from a raised to a lowered position for actuating the sheet disposing means for positioning another sheet of wrapping material below said guiding means preparatory to the next wrapping cycle.

6. A device of the class described for applying and securing a sheet of wrapping material over the upper open top of a tubular cake pan, the outer wall of which terminates in an outturned bead, which device comprises in combination, a package support platform, means operable for moving said platform from a lowered to a raised position along a fixed vertical path, an open bottomed and open topped housing disposed above and in axial alignment with said platform, said housing having vertical side walls of a contour similar to the contour of the package to be wrapped, means for releasably positioning a sheet of wrapping material across the open bottom of said housing, a tying and knotting mechanism including a wrapping arm mounted for rotation about the axis of said housing, a stop member disposed in vertical alignment with said platform and positioned above said housing, said first mentioned means including a foot treadle movable from raised to lower positions for moving said platform from lowered to raised positions, said platform, when moved upwardly, forcing a package to be wrapped upwardly against the sheet of wrapping material and through said housing for disposing said sheet of wrapping material across the top or upper portion and downwardly over the side walls of said package, said package being limited in its upward movement by said stop member for locating the rim of said pan above the upper edge of said housing, means operable upon movement of said foot treadle to lowered position for actuating said tying and knotting mechanism for applying sheet securing means around the upper perimeter of a pan immediately below its bead, and means operable upon lowering of said platform from a raised to a lowered position for actuating the sheet positioning means to position a sheet of wrapping material across the open bottom of said housing.

7. A device of the class described for applying and securing a sheet of wrapping material over the upper open top of a tubular cake pan, the outer wall of which terminates in an outturned bead, which device comprises in combination, a platform, a vertical track, a guide plate including a track follower, an arm interconnecting said platform to said plate, an actuating member pivoted intermediate its length, a foot treadle secured to and carried by one end thereof, a lever pivoted at one end to a supporting structure, a connector link pivotally secured at one end to said plate and at its other end to the free end of said lever, and means for resiliently connecting that end of said actuating member remote from said foot treadle to said lever intermediate its ends for imparting a yielding upward movement to said guide plate incident to a lowering of said foot treadle, a substantially circular opened topped and open bottomed guide member located above and in axial alignment with said platform, a stop member disposed in vertical alignment with said platform and above the top of said guide member, a tying and knotting device including a tying arm mounted for rotation about the axis of said platform, a clutch mechanism for controlling the operating characteristics of said device, a clutch actuator rod interconnecting said actuating member with said clutch mechanism for driving said tying and knotting device only during those periods of time when said platform is in a fully raised position, and means operable incident to a lowering of said platform for positioning a sheet of wrapping material across the open bottom of said guide member, said means including a sheet material severing blade, a sheet material conveyor, and means for controlling the operating characteristics of said last mentioned means, a blade actuating rod, and means interconnecting said rod and actuating member operable for shifting said rod to move said blade to a sheet material severing position incident to a raising of said foot treadle after having been fully depressed, said rod and blade returnable to their original positions as said treadle is further raised for actuating the means which controls the operating characteristics of said conveyor for disposing a sheet of material beneath the open bottom of said guideway.

JACKSON M. LUKER.

REFERENCES CITED

The following references are of record in the file of this patent:

UNITED STATES PATENTS

| Number | Name | Date |
|---|---|---|
| 1,606,290 | Bunn | Nov. 9, 1926 |
| 1,761,771 | Brownell | June 3, 1930 |
| 1,861,551 | Remillard | June 7, 1932 |
| 1,994,453 | Bunn | Mar. 19, 1935 |